(12) United States Patent
Srivatsa et al.

(10) Patent No.: US 12,106,082 B2
(45) Date of Patent: Oct. 1, 2024

(54) GENERATIVE EXPERIMENTS FOR APPLICATION DEPLOYMENT IN 5G NETWORKS

(71) Applicant: INTERNATIONAL BUSINESS MACHINES CORPORATION, Armonk, NY (US)

(72) Inventors: Mudhakar Srivatsa, White Plains, NY (US); Dinesh C. Verma, New Castle, NY (US); Satish Sadagopan, Leawood, KS (US); Mathews Thomas, Flower Mound, TX (US); Utpal Mangla, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 16 days.

(21) Appl. No.: 17/326,278

(22) Filed: May 20, 2021

(65) Prior Publication Data

US 2022/0374215 A1 Nov. 24, 2022

(51) Int. Cl.
*G06F 8/60* (2018.01)
*G06N 3/08* (2023.01)
*H04W 84/04* (2009.01)

(52) U.S. Cl.
CPC ............. *G06F 8/60* (2013.01); *G06N 3/08* (2013.01); *H04W 84/042* (2013.01)

(58) Field of Classification Search
None
See application file for complete search history.

(56) References Cited

U.S. PATENT DOCUMENTS 7,089,299 B2   8/2006   Chetuparambil et al.
8,825,811 B2   9/2014   Gonzales et al.
(Continued)

FOREIGN PATENT DOCUMENTS

CN   109542457 A   3/2016
CN   111027736 A   4/2020
(Continued)

OTHER PUBLICATIONS

Huawei, et al., General descriptions and reference architectures for Edge Computing 3GPP TSG-WG SA2 Meeting #143E e-meeting S2-2100115, Mar. 2021, 3 pgs.
(Continued)

*Primary Examiner* — Lewis A Bullock, Jr.
*Assistant Examiner* — Mark A Gooray
(74) *Attorney, Agent, or Firm* — Intelletek Law Group, PLLC; Gabriel Daniel, Esq.

(57) ABSTRACT

A computer implemented method determines a placement of an application being added to a network. The method includes determining a logical-physical mapping for the application. Sub-graphs in the logical-physical mapping are identified. A stored application in a catalog of applications previously used in the network is located. The stored application includes one of the sub-graphs in the logical-physical mapping. An experiment is generated, performed by a computing device running a neural network model, using the sub-graphs. The experiment includes inducing a physical node mapping for the sub-graph. A cost function associated with a placement of the application being added to the network to one or more physical nodes in the induced physical node mapping is determined.

14 Claims, 8 Drawing Sheets

(56) References Cited

U.S. PATENT DOCUMENTS

| | | | |
|---|---|---|---|
| 10,824,489 B2 | 11/2020 | Caldato et al. | |
| 2020/0202215 A1 | 6/2020 | Sadowski | |
| 2020/0334022 A1* | 10/2020 | Bhatnagar | G06F 8/60 |
| 2021/0075887 A1* | 3/2021 | Pavlin | G06F 8/60 |

FOREIGN PATENT DOCUMENTS

| | | |
|---|---|---|
| CN | 111462487 A | 7/2020 |
| CN | 111552482 A | 8/2020 |
| CN | 110187973 A | 1/2021 |
| CN | 112688848 A | 4/2021 |
| IN | 111279309 A | 6/2020 |
| WO | 2020133967 A1 | 7/2020 |
| WO | 2020228534 A1 | 11/2020 |

OTHER PUBLICATIONS

International Search Report and Written Opinion issued Jun. 29, 2022 in related international patent application No. PCT/CN2022/085466, 8 pgs.

Mell, P. et al., "Recommendations of the National Institute of Standards and Technology"; NIST Special Publication 800-145 (2011); 7 pgs.

Yan, J. et al., "A Short Survey of Recent Advances in Graph Matching", Proceedings of the 2016 ACM on International Conference on Multimedia Retrieval (2016), Abstract, 2 pgs.

\* cited by examiner

GENERATIVE EXPERIMENTS FOR APPLICATION DEPLOYMENT IN 5G NETWORKS

BACKGROUND

Technical Field

The present disclosure generally relates to networking systems, and more particularly, to generative experiments for application deployment in 5G networks.

Description of the Related Art

Cloud computing networks face many challenges in determining where to best locate an application or service. With the increasing use of the 5G standard and mobile edge computing (MEC) servers deployed on the edge of networks, the choices available for placement of an application or service may include millions of options in some cloud networks. Working on 5G means working on higher frequencies. Being on higher frequencies can result in higher propagation loss due to many factors including reflection, refraction, and diffraction which may have significant effects on finding the best placement for application elements on a network.

Aside from the physical elements that may affect service elements on a network, there is an additional challenge in finding optimal placement of applications which are novel to a network. While some approaches may be able to refer to how an application or microservice of the application was previously placed, novel applications may have an entirely different effect when placed into a network. Manual trial and error generally results in inefficient deployment of resources which can have a significant impact on the overall network. Systems that administer deployment have a need to improve on how deployment of applications is determined.

SUMMARY

According to an embodiment of the present disclosure, a method for determining placement of an application being added to a network is provided. The method includes determining a logical-physical mapping for the application being added to the network. One or more sub-graphs in the logical-physical mapping of the application being added to the network is identified. A stored application in a catalog of applications previously used in the network is located. The stored application includes one of the one or more sub-graphs in the logical-physical mapping of the application being added to the network. An experiment is generated, performed by a computing device running a neural network model, using the one of the one or more sub-graphs. The experiment includes inducing a physical node mapping for the one of the one or more sub-graphs. A placement of the application being added to the network to one or more physical nodes in the induced physical node mapping is determined.

In one embodiment, the method includes selecting the placement of the application being added to the network to one of the one or more physical nodes in the induced physical node mapping based on determining a most cost-effective cost function associated with the placement. As may be appreciated, this feature discloses a practical application of the method. The feature provides a benefit that improves on the cost efficiency of the computing technology involved.

According to an embodiment of the present disclosure, a computer program product for determining a potential impact from software upgrades on a computing device is provided. The computer program product includes one or more computer readable storage media, and program instructions collectively stored on the one or more computer readable storage media. The program instructions include determining a logical-physical mapping for the application being added to the network. One or more sub-graphs in the logical-physical mapping of the application being added to the network is identified. A stored application in a catalog of applications previously used in the network is located. The stored application includes one of the one or more sub-graphs in the logical-physical mapping of the application being added to the network. An experiment is generated, performed by a computing device running a neural network model, using the one of the one or more sub-graphs. The experiment includes inducing a physical node mapping for the one of the one or more sub-graphs. A placement of the application being added to the network to one or more physical nodes in the induced physical node mapping is determined.

According to one embodiment, the program instructions further include iterating the acts of identifying the sub-graph with the lowest matching score for sub-graphs with a next lowest matching score; generating the experiment; and determining the cost function until a most cost-effective placement of the application. This combination of features allows the subject technology to evaluate different candidates of previously allocated applications to find a potentially best comparable placement scenario. The feature also allows the neural model to improve its ability to efficiently locate positions on the network for application placement.

According to an embodiment of the present disclosure, a computer server is disclosed. The computer server includes: a network connection; one or more computer readable storage media; a processor coupled to the network connection and coupled to the one or more computer readable storage media; and a computer program product including program instructions collectively stored on the one or more computer readable storage media. The program instructions include determining a logical-physical mapping for the application being added to the network. One or more sub-graphs in the logical-physical mapping of the application being added to the network is identified. A stored application in a catalog of applications previously used in the network is located. The stored application includes one of the one or more sub-graphs in the logical-physical mapping of the application being added to the network. An experiment is generated, performed by the computer server running a neural network model. The experiment uses the one of the one or more sub-graphs. The experiment includes inducing a physical node mapping for the one of the one or more sub-graphs. A placement of the application being added to the network to one or more physical nodes in the induced physical node mapping is determined.

According to one embodiment, the program instructions for the computer server further comprise determining a local maxima for the cost function based on a user input budget constraint for running the step of generating the experiment. This feature allows a user to control the resources that will be expended in running the experiments, which otherwise may run for an impractical time with the millions of possible combinations available to evaluate.

By virtue of the methods and systems discussed herein, it will be appreciated that deployment of applications becomes improved with higher accuracy in the placement of applications within the network. The embodiments are able to more quickly identify candidate placement scenarios through experimentation. The experiments run by the embodiments are more effective by locating next best experiments in a catalog which may have sub-graphs of microservices that are similar to microservices in the application being placed. Any constraints in the application may be accounted for during the experiments. Accordingly, a neural network model running the experiments may learn from the previous scenarios and determine a cost effective placement.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods for determining how to deploy applications in networks. In an exemplary embodiment, aspects of the subject technology may be used in 5G standard based networks. Some of these networks may be cloud based as described more fully below. Generally, the embodiments may be practiced in the fields of computers and computer networks.

In the subject disclosure that follows, embodiments may use a neural network to generate experiments that determine logical mapping of applications to positions on a network. The positions may include a network edge, for example, in fog applications. As may be appreciated, aspects of the subject technology provide an improvement to computing technology. While some of the description is related to running experiments, it should be appreciated that some of the experiment processes described are run by neural network technology that is processing potentially millions of possible combinations (which may be impossible to perform manually). In addition, there are features of identifying closest sub-graphs in historical data that are unconventionally used to generate a next best experiment. One notable result is that features of the subject technology make deployment of applications and/or services in a cloud computing network more efficient, thus improving the state of the subject field of computing.

Example Architecture

Figure 1:
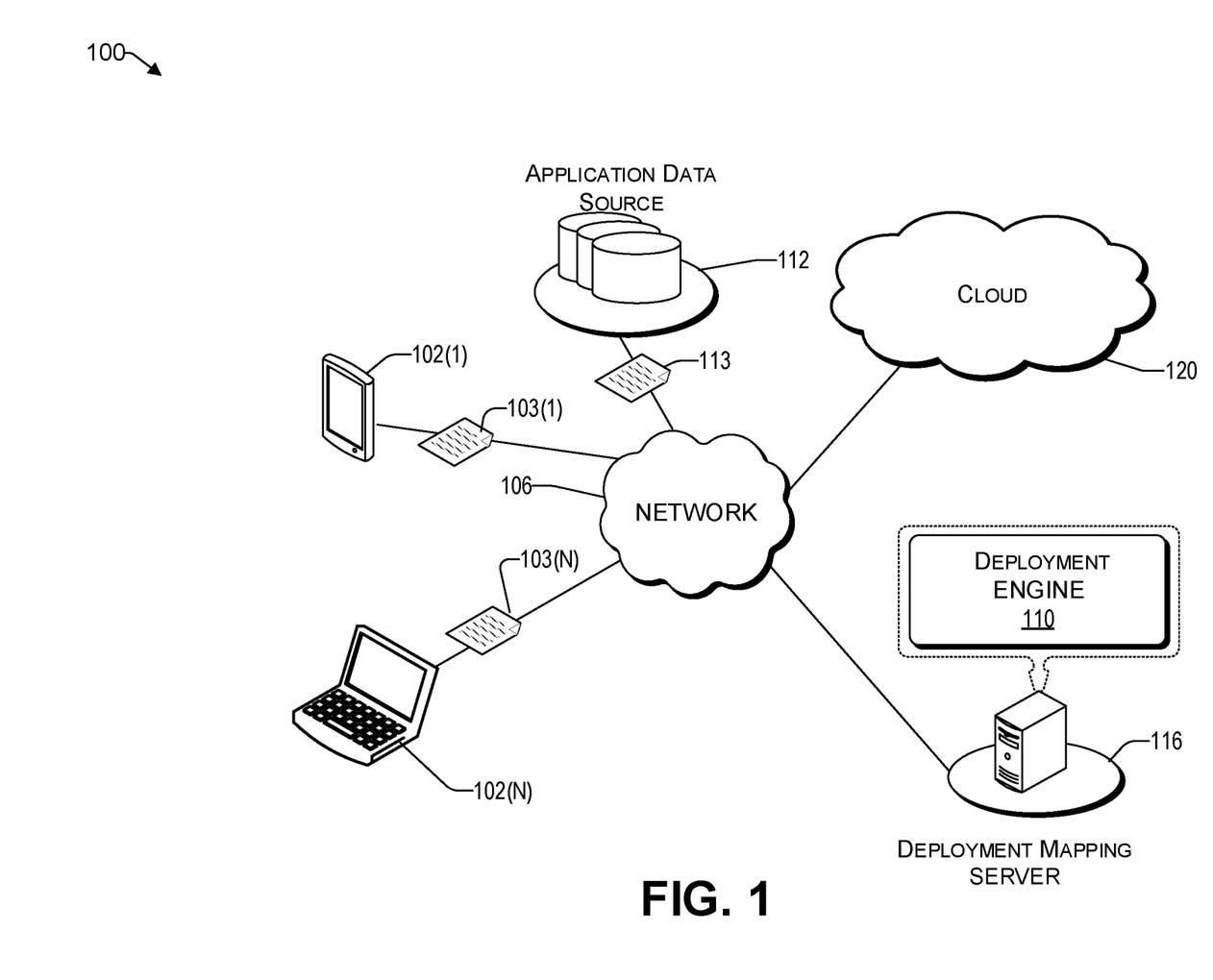
FIG. 1 is a block diagram of an architecture for application deployment in 5G networks according to an embodiment.

FIG. 1 illustrates an example architecture 100 for deploying applications in a network. Architecture 100 includes a network 106 that allows various computing devices 102(1) to 102(N) to communicate with each other, as well as other elements that are connected to the network 106, such as update data source 112, a deployment mapping server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows a deployment engine 110, which is a software program running on the deployment mapping server 116, to communicate with the application data source 112, computing devices 102(1) to 102(N), and the cloud 120, to provide data processing. The application data source 112 may provide data about applications and/or microservices that will be processed under one or more techniques described here. In one embodiment, the application data is processed for deployment on the cloud 120.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the deployment engine 110 of the deployment mapping server 116. Today, user devices typically take the form of portable handsets, smart-phones, tablet computers, personal digital assistants (PDAs), and smart watches, although they may be implemented in other form factors, including consumer, and business electronic devices.

For example, a computing device (e.g., 102(N)) may send a request 103(N) to the deployment engine 110 to identify where placement of an application and/or microservice should be located in the cloud 120.

While the application data source 112 and the deployment engine 110 are illustrated by way of example to be on different platforms, it will be understood that in various embodiments, the application data source 112 and the deployment mapping server 116 may be combined. In other embodiments, these computing platforms may be implemented by virtual computing devices in the form of virtual machines or software containers that are hosted in a cloud 120, thereby providing an elastic architecture for processing and storage.

Figure 2:
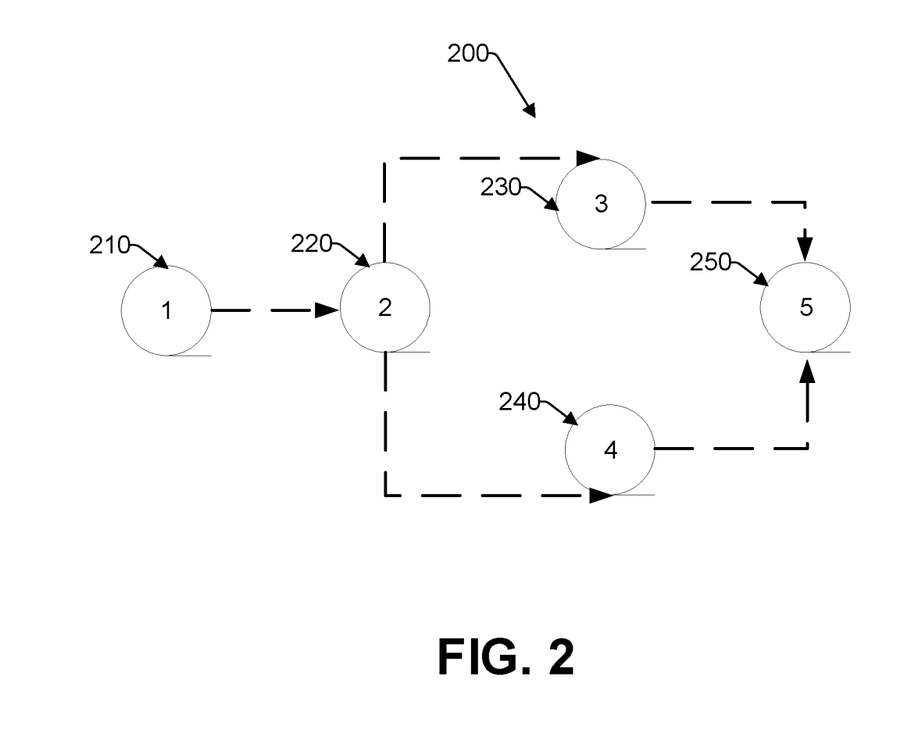
FIG. 2 is a block diagram of a logical graph map for microservices of a fog application according to some embodiments.
Figure 3:
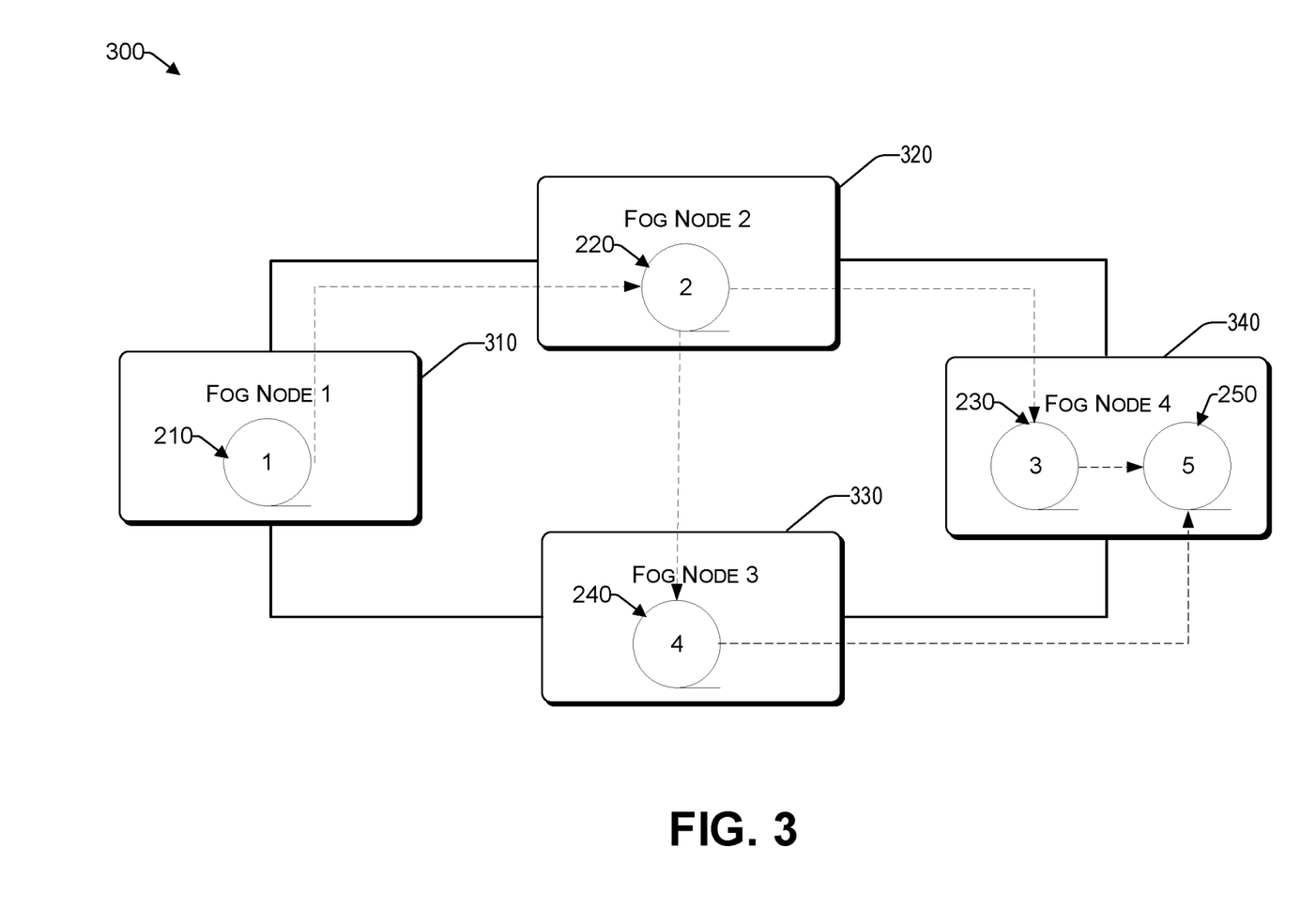
FIG. 3 is a block diagram of a physical graph map of microservices mapped to fog nodes according to some embodiments according to an embodiment.

Reference now is made to FIG. 2 and FIG. 3, which show how mapping of microservices of a fog application to fog nodes may be illustrated. FIG. 2 shows a logical graph 200 of microservices 210-250 for a fog application. FIG. 3 shows a physical graph 300 of the microservices 210-250 mapped to fog nodes 310-340. The microservices 210-250 may represent different computing services (for example, 210 may represent a service capturing imagery, 220 may represent a service performing a discrete cosine transform on the imagery, 230 and 240 may represent services performing looking for features, and 250 may represent a service assembling the results of services 210-240. When mapped to the physical graph 300, the service nodes and logical edges in the logical graph 200 may be mapped to a physical node in the physical graph 300. Edges may be mapped to a single edge or a multi-hub edge. While 220 and 230 have a direct edge in the logical graph 200, in the physical graph 300 they may have an indirect edge. As may be appreciated, with respect to a physical resource and a logical graph, aspects of the subject technology correlate a compute action and a communication in the logical graph to a corresponding physical graph. There may be several placement constraints on the nodes that have to be accounted for when mapping. An anti-affinity condition, for example, may not have microservice 210 and microservice 220 running on the same machine for security purposes. Another constraint may be related to power consumption or memory requirements needed for a microservice. The possible combinations of applications placements may be in the millions considering the numerous potential locations and variables involved. When a user has a different composition of applications, for example, different applications running than a previous set of applications, the optimal placement for nodes may be different.

When a microservice application is to be run on a 5G edge, the subject technology performs experiments to figure out the best mapping. A specific microservice structure being run may potentially be previously unseen, and thus its optimal placement is unknown. For example, there may be a new composition of an application. Referring back to FIG. 2, users may have generally combined microservices 220, 230, and 240, but now microservices 230, 240, and 250 are being combined so there is a different set of nodes being combined. With a potentially infinite set of combinations available, it may not be surprising that given an application being implemented, the set of services may not match a set seen in the past. However, the subject technology makes use of a set of the nodes in the application that may have been seen in the past.

For example, an application S may be novel but its sub-graphs s may be covered by different applications that have been studied in a catalog. Sub-graphs may be, for example, the combination of microservices 210 and 220 shown in FIG. 2, or the combination 210, 230, and 250 shown in FIG. 2.

In one aspect of the subject technology, a reinforcement learning like approach is being suggested to determine the next best experiment that can be done. "Next best" refers to finding an experiment that includes a combination of sub-graphs from the catalog S that best matches one or more of the sub-graphs in the application being placed. With a new application, experiments on the catalog may be constructed so that the neural network can predict the performance of the previously unseen microservice application in the network it is being placed into.

Example Methodology

Figure 4:
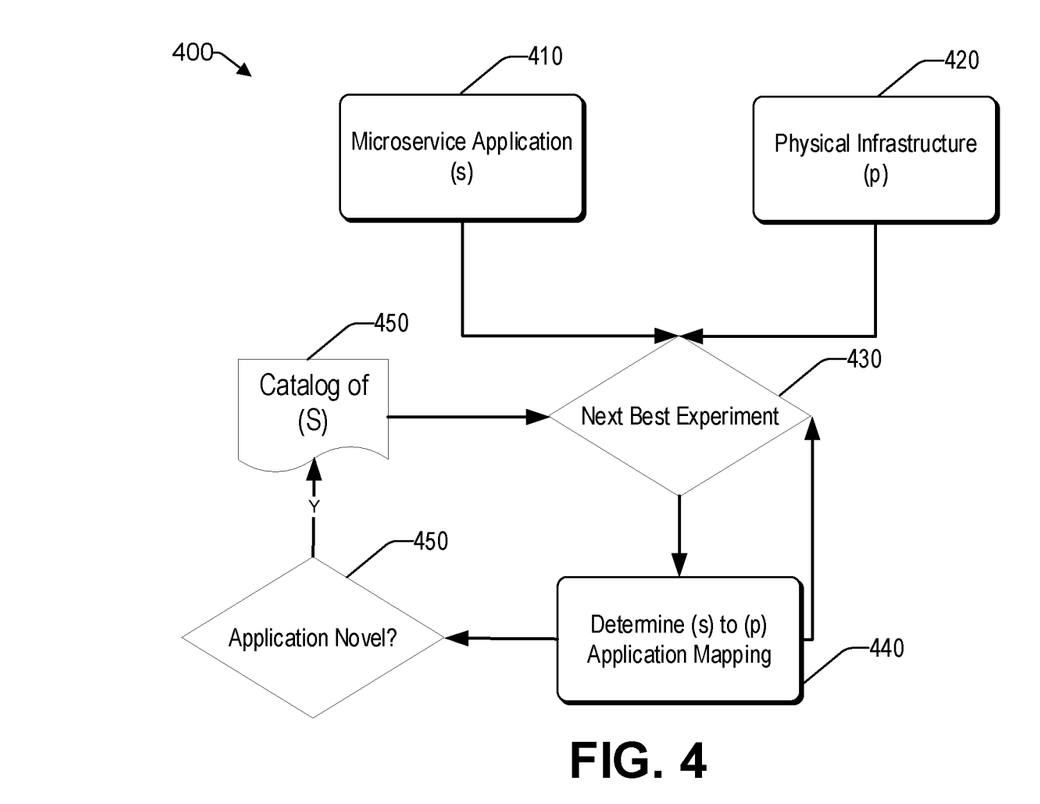
FIG. 4 is a flowchart of a method for determining best logical-physical mapping of microservice applications according to an embodiment.

Referring now to FIG. 4, a method 400 for determining best logical-physical mapping of microservice applications is shown according to an exemplary embodiment. To implement the method 400, an exemplary setting may assume working with a suite of micro-service applications S (for example, from open source, or custom VNF/CNF chains, etc.) that are stored in a database. The method 400 may be implemented using a 5G test bed and workload generators that allows running a micro-service applications (410) in a catalog S (450) on a chosen physical infrastructure 420 and a given logical-physical mapping. Given a micro-service application s (410) which may potentially not already be in the set S of catalog 450) and a target physical infrastructure (420) (potentially unseen), the method 400 determines the best logical-physical mapping for the micro-service application (410). When the microservice application s (410) is novel, its sub-graphs may be covered by different applications in catalog S.

A processor may recommend 430 the next best experiment to run on the test bed to improve logical-physical mapping for the microservice application (410). An example of generating experiments under the subject technology is discussed in more detail with respect to FIG. 5 below. Prior application key performance indicator (KPI) measurements for a certain subset of logical-physical mappings of applications may be drawn from the set of S on a different physical infrastructure. The prior performance measurements may be held in a database accessible by the system running the experiments. In some embodiments, the processor may iterate 440 the process with more experiments with the goal of improving logical-physical mapping. In some embodiments, if the microservice application (410) is determined 450 to be novel, the microservice application (410) may be added to the catalog 450.

Figure 5:
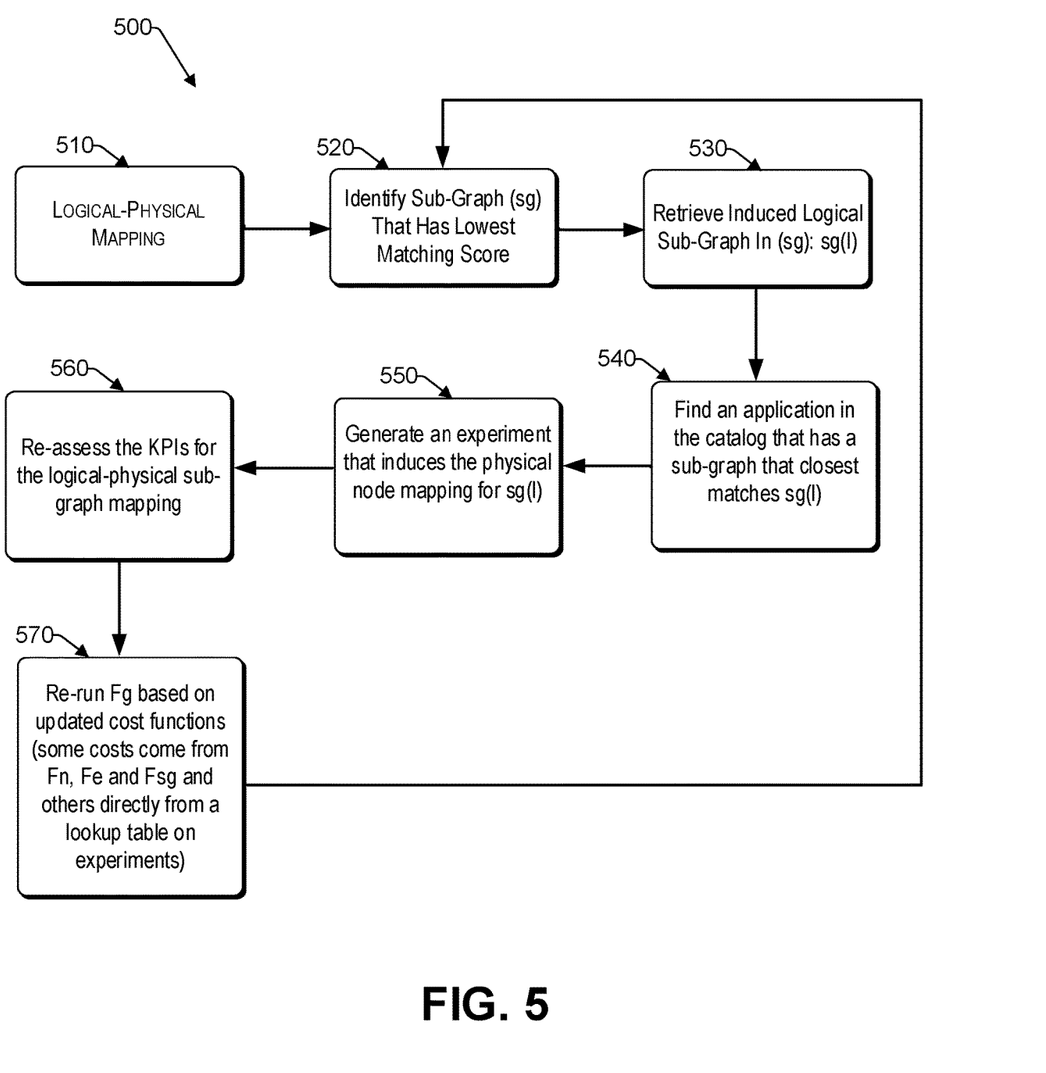
FIG. 5 is a flowchart of a method performing neural network based generative experiments to determine placement choices for a microservice application in a network according to an embodiment.

Referring now to FIG. 5, a method 500 for performing neural network based generative experiments to determine placement choices for a microservice application in a network is shown according to an exemplary embodiment. For a microservice node (node in logical graph), the method 500 learns a neural embedding based on the micro-service's description. For an infrastructure node (node in physical graph), the method 500 learns a neural embedding based on specifications. The following elements may be trained from historical application KPIs:

MLP (Multi-layer perceptron) $F_n(l_n, p_n)$: matching score between a logical node $l_n$ and physical node $p_n$; $l_n$ and $p_n$ are represented by their embedding vectors derived from the description and a MLP is a simple feedforward neural network that learns the match (between 0 and 1) for $l_n$ and $p_n$. The higher the matching score, the better the match between $l_n$ and $p_n$, and thus the match is good to map the logical node $l_n$ onto the physical node $p_n$.

MLP $F_e(l_{n1}, p_{n1}, l_{n2}, p_{n2})$: matching score between an edge connection ($l_{n1}$ on $p_{n1}$) with ($l_{n2}$ on $p_{n2}$); extends the matching score between two nodes to that of link/edge. Note that $p_{n1}$ could be the same or different from $p_{n2}$. Similar to the above, each logical/physical node is represented as an embedding vector derived from their description and the ML learns a match (between 0 and 1) for $l_{n1}$ on $p_{n1}$ being connected to $l_{n2}$ on $p_{n2}$.

GCNN (Graph Convolution Neural Network) $F_{sg}(l_{sg}, p_{sg},$ mapping): matching score for a logical-physical sub-graph mapping; extends the matching score to a subgraph where two or more logical nodes are mapped to one or more physical nodes. Since the MLP may fail to capture the graph structure, a GCNN (graph convolutional neural network) may be used to capture the subgraph structure in both the logical and physical graph and mapping structure between them.

$F_g$ ($l_g$, $p_g$): determine the placement for every node in $l_g$ on $p_g$ using above cost functions. Given matching functions at the level of nodes, links and subgraphs, matches between nodes, links and sub-graph in the application to prior measurements may be identified and the overall application KPIs may be estimated.

Starting with a feasible logical-physical mapping 510, the method may identify 520 a sub-graph $s_g$ that has the lowest matching score (sub-graph includes nodes and edges). Matches may be applied in the order of sub-graph match, then a link match then a node match. In some embodiments, the process may start with the largest matching sub-graph to assess the overall score. If no large subgraph match is found then the process may try to find links that match. If no links are found then the process may look to node level matching scores. An induced logical sub-graph in sg: sg(1) may be retrieved 530. An application in the catalog that has a sub-graph that closest matches sg(1) may be identified 540. When determining closest matching sub-graphs, the logical and physical graphs may be directed graphs and matching may be defined on two subgraphs as the fraction of nodes/links in the two sub-graphs that are common to the two sub-graphs. Using the closest matching sub-graph identified, an experiment may be generated 550 that induces the physical node mapping for sg(1). In some embodiments, the method may re-assess 560 the KPIs for the logical-physical sub-graph mapping. The process to determine placement Fg may be re-run 570 based on updated cost functions. Some costs come from Fn, Fe and Fsg and others directly from a lookup table on experiments. The method may repeat or loop from step 520 as needed. The constraint for looping may be based on a budget provided to the system running the experiments. For example, a time budget may be based on the time it takes to perform a number of runs. A computing cost budget may be based on how much computing power is needed to perform a number of runs.

Example Computer Platform

Figure 6:
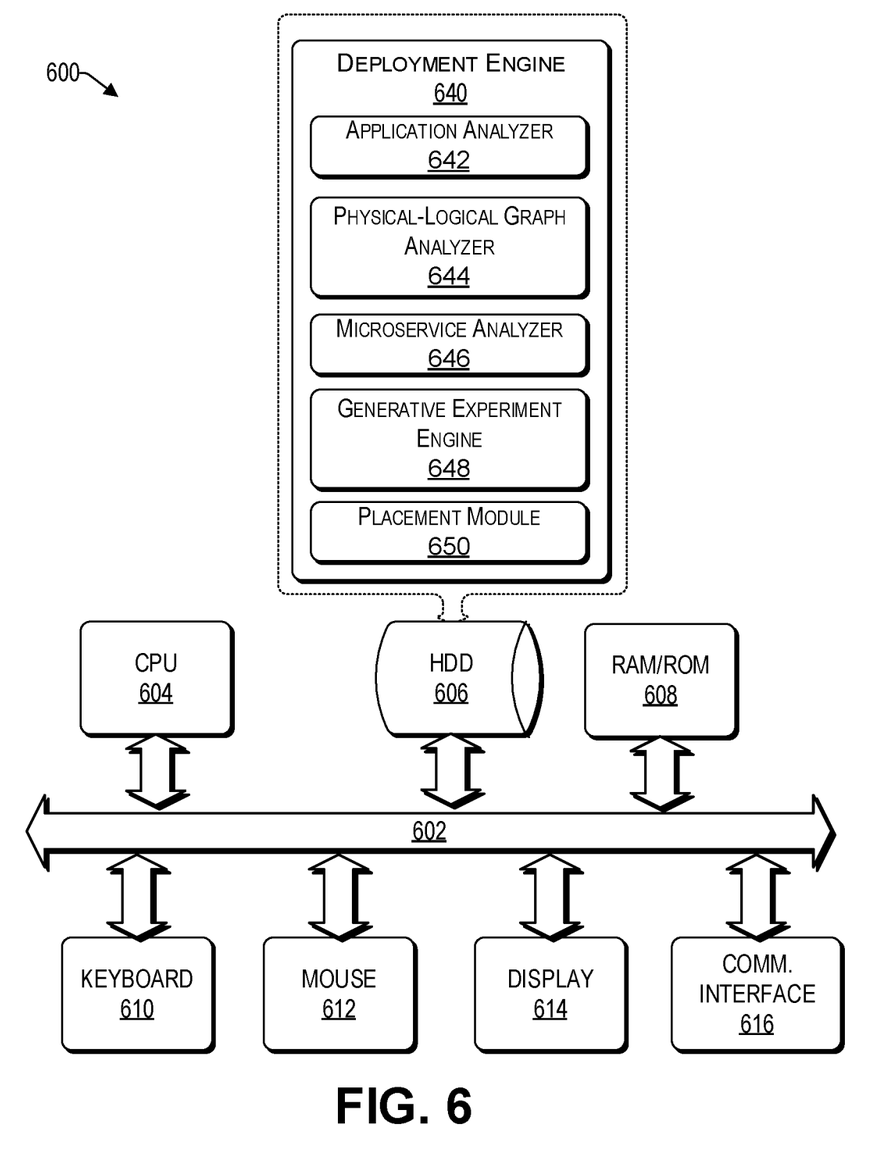
FIG. 6 is a functional block diagram illustration of a particularly configured computer hardware platform that can communicate with various networked components.

As discussed above, functions relating to interpretable modeling of the subject disclosure can be performed with the use of one or more computing devices connected for data communication via wireless or wired communication, as shown in FIG. 1. FIG. 6 is a functional block diagram illustration of a computer hardware platform that can communicate with various networked components, such as a training input data source, the cloud, etc. In particular, FIG. 6 illustrates a network or host computer platform 600, as may be used to implement a server, such as the deployment mapping server 116 of FIG. 1.

The computer platform 600 may include a central processing unit (CPU) 604, a hard disk drive (HDD) 606, random access memory (RAM) and/or read only memory (ROM) 608, a keyboard 610, a mouse 612, a display 614, and a communication interface 616, which are connected to a system bus 602.

In one embodiment, the HDD 606, has capabilities that include storing a program that can execute various processes, such as the deployment engine 640, in a manner described herein. Generally, the deployment engine 640 may be configured to analyze computing devices for projected stability after a software upgrade under the embodiments described above. The deployment engine 640 may have various modules configured to perform different functions. In some embodiments, the deployment engine 640 may include sub-modules. For example, an application analyzer 642, a physical-logical graph analyzer 644, a microservice analyzer 646, a generative experiment engine 648, and a service placement module 650.

In another embodiment, the computer platform 500 may represent an end user computer (for example, computing devices 102(1) to 102(N)). In this context, the various end user computer platforms 600 may include mixed configurations of hardware elements and software packages.

Example Cloud Platform

As discussed above, functions relating to analyzing the impact of a software upgrade on a computing device, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
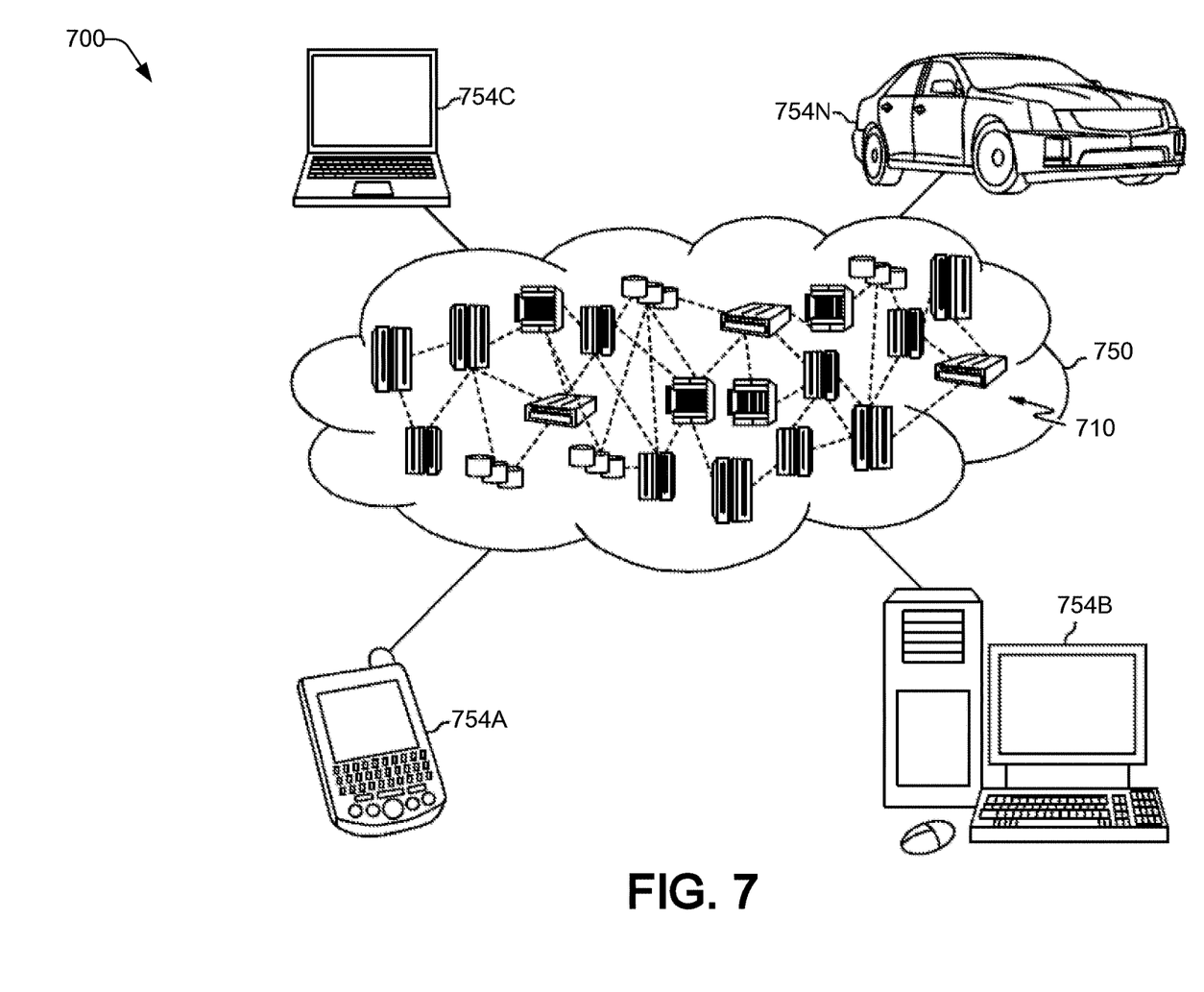
FIG. 7 depicts a cloud computing environment, consistent with an illustrative embodiment.

Referring now to FIG. 7, an illustrative cloud computing environment 700 is depicted. As shown, cloud computing environment 700 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 810 and cloud computing environment 750 can communicate with any type of computerized device over any type of network and/or network addressable connection (e.g., using a web browser).

Figure 8:
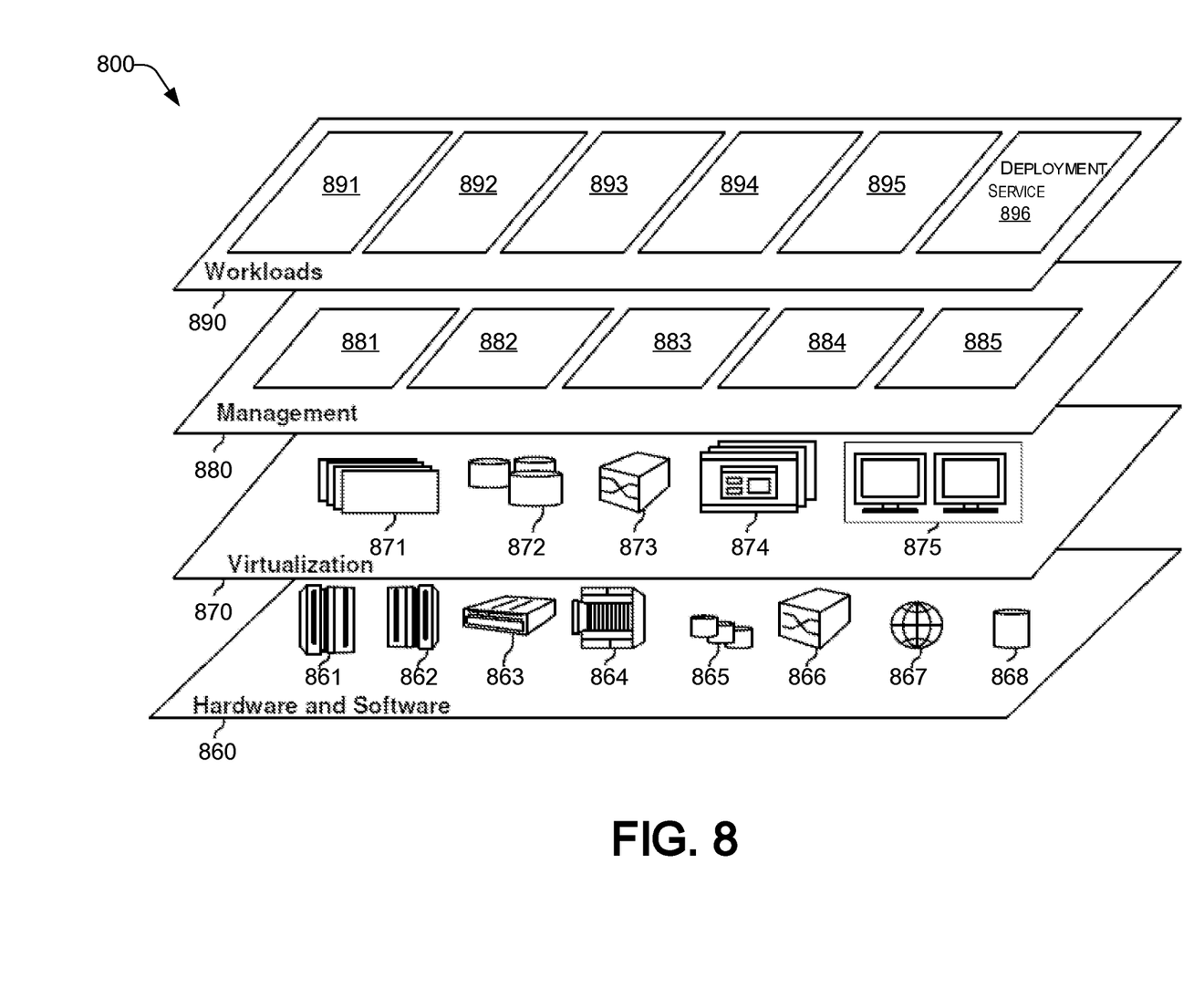
FIG. 8 depicts abstraction model layers, consistent with an illustrative embodiment.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and deployment services 896, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method for determining a placement of an application being added to a network, comprising:
   determining a logical-physical mapping for the application being added to the network;
   identifying one or more sub-graphs in the logical-physical mapping of the application being added to the network;

iteratively identifying a sub-graph with a lowest matching score between embedding vectors of a logical node $l_a$ and a physical node $p_n$ from the one or more sub-graphs, wherein after each iteration, a next lowest matching sub-graph of the one or more sub-graphs is selected;

for each respective iteration:
locating a stored application in a catalog of applications previously used in the network, wherein:
the stored application is located in the catalog based on determining that-one of the one or more sub-graphs of the stored application is a closest matching sub-graph to its respective iteratively identified sub-graph of the logical-physical mapping of the application being added to the network;
running a neural network model by a computing device, by performing an experiment using the respective closest matching sub-graph of the one of the one or more sub-graphs of the stored application, wherein the experiment includes inducing a physical node mapping of respective closest matching sub-graph and determining a computing cost function; and
deploying the application being added to the network to a selected one or more physical nodes of one of the one or more respective induced physical node mapping of one of the closest matching sub-graphs based on determining a most effective computing cost function by comparing the computing cost function of each iteratively performed experiments.

2. The method of claim 1, further comprising:
iterating:
the act of identifying the sub-graph with the lowest matching score for sub-graphs with a next lowest matching score;
the act of performing the experiment; and
the act of determining the placement of the application, until a most cost-effective placement of the application is determined.

3. The method of claim 2, further comprising determining a local maxima for the computing cost function based on a user input budget constraint for running the act of performing the experiment.

4. The method of claim 1, further comprising:
generating a logical-physical sub-graph mapping from the performed experiment; and
assessing key performance indicators for the logical-physical sub-graph mapping.

5. The method of claim 1, wherein the experiment accounts for conditions placed on the application including anti-affinity constraints and/or memory requirements associated with the application.

6. A computer program product for determining placement of an application being added to a network, the computer program product comprising:
one or more non-transitory computer readable storage media, and program instructions collectively stored on the one or more non-transitory computer readable storage media, the program instructions comprising:
determining a logical-physical mapping for the application being added to the network;
iteratively identifying one or more sub-graphs in the logical-physical mapping of the application being added to the network, a sub-graph with a lowest matching score between embedding vectors of a logical node $l_n$ and a physical node $p_n$ from the one or more sub-graphs, wherein after each iteration, the next lowest matching sub-graph of the one or more sub-graphs is selected;

for each respective iteration:
locating a stored application in a catalog of applications previously used in the network, wherein:
the stored application includes one of the one or more sub-graphs in the logical-physical mapping of the application being added to the network;
running a neural network model by a computing device, by performing an experiment using the respective closest matching sub-graph of the one of the one or more sub-graphs of the stored application, wherein the experiment includes inducing a physical node mapping of the respective closest matching sub-graph and determining a computing cost function; and
deploying the application being added to the network to a selected one or more physical nodes of one of the one or more respective induced physical node mapping of one of the closest matching sub-graphs based on determining a most effective computing cost function by comparing the computing cost function of each iteratively performed experiments.

7. The computer program product of claim 6, wherein the program instructions further comprise:
iterating:
the act of identifying the sub-graph with the lowest matching score for sub-graphs with a next lowest matching score;
the act of performing the experiment; and
the act of determining the placement of the application, until a most cost-effective placement of the application is determined.

8. The computer program product of claim 7, wherein the program instructions further comprise determining a local maxima for the computing cost function based on a user input budget constraint for running the step of performing the experiment.

9. The computer program product of claim 6, wherein the program instructions further comprise:
generating a logical-physical sub-graph mapping from the performed experiment; and
re-assessing key performance indicators for the logical-physical sub-graph mapping.

10. The computer program product of claim 6, wherein the experiment accounts for conditions placed on the application including anti-affinity constraints and/or memory requirements associated with the application.

11. An application deployment computer server, comprising:
a network connection;
one or more computer readable storage media;
a processor coupled to the network connection and coupled to the one or more computer readable storage media; and
a computer program product comprising program instructions collectively stored on the one or more computer readable storage media, the program instructions comprising:
determining a logical-physical mapping for the application being added to the network;
identifying one or more sub-graphs in the logical-physical mapping of the application being added to the network;

iteratively identifying a sub-graph with a lowest matching score between embedding vectors of a logical node $l_n$ and a physical node $p_n$ from the one or more sub-graphs, wherein after each iteration, the next lowest matching sub-graph of the one or more sub-graphs is selected;

for each respective iteration:
  locating a stored application in a catalog of applications previously used in the network, wherein:
    the stored application is located in the catalog based on determining that one of the one or more sub-graphs of the stored application is a closest matching sub-graph to its respective iteratively identified sub-graph in the logical-physical mapping of the application being added to the network;
  performing an experiment, by the computer server, wherein the computer server runs a neural network model, using the respective closest matching sub-graph of the one of the one or more sub-graphs, wherein the experiment includes inducing a physical node mapping of the respective closest matching sub-graph and determining a computing cost function; and
  deploying the application being added to the network to a selected one or more physical nodes of one of the one or more respective induced physical node mapping of one of the closest matching sub-graphs based on determining a most effective computing cost function by comparing the computing cost function of each iteratively performed experiments.

12. The computer server of claim 11, wherein the program instructions further comprise:
  iterating:
    the act of identifying the sub-graph with the lowest matching score for sub-graphs with a next lowest matching score;
    the act of performing the experiment; and
    the act of deploying the application, until a most cost-effective placement of the application is determined.

13. The computer server of claim 12, wherein the program instructions further comprise determining a local maxima for the computing cost function based on a user input budget constraint for running the act of performing the experiment.

14. The computer server of claim 11, wherein the program instructions further comprise:
  generating a logical-physical sub-graph mapping from the performed experiment; and
  re-assessing key performance indicators for the logical-physical sub-graph mapping.

* * * * *